United States Patent [19]

Mishima

[11] 4,376,903
[45] Mar. 15, 1983

[54] DIRECT CURRENT DYNAMO ELECTRIC MACHINE

[75] Inventor: Matsuo Mishima, Tokyo, Japan

[73] Assignee: Micro Technology Laboratory Co., Ltd., Tokyo, Japan

[21] Appl. No.: 148,288

[22] Filed: May 9, 1980

Related U.S. Application Data

[63] Continuation of Ser. No. 750,890, Dec. 15, 1976, abandoned.

[30] Foreign Application Priority Data

Dec. 23, 1975 [JP] Japan .................................. 50-153703
Dec. 29, 1975 [JP] Japan .................................. 50-159022

[51] Int. Cl.³ ............................................ H02K 21/28
[52] U.S. Cl. .................................... 310/154; 310/266; 310/265
[58] Field of Search ........................ 310/154, 266, 265

[56] References Cited

U.S. PATENT DOCUMENTS

| 436,408 | 9/1890 | Field | 310/265 |
|---|---|---|---|
| 518,312 | 4/1894 | Egger et al. | 310/265 |
| 2,332,877 | 10/1943 | Villard | 310/266 |
| 3,209,187 | 9/1965 | Angele | 310/154 X |
| 3,334,254 | 8/1967 | Kober | 310/156 |
| 3,335,309 | 8/1967 | Hansen | 310/266 |
| 3,828,213 | 8/1974 | Yamashita et al. | 310/154 X |
| 3,836,802 | 9/1974 | Parker | 310/154 |
| 3,871,070 | 3/1975 | Kazansky et al. | 310/266 X |
| 3,891,876 | 6/1975 | Herr et al. | 310/154 X |
| 3,909,268 | 9/1975 | de Graffenried | 310/154 |
| 3,909,645 | 9/1975 | Herr et al. | 310/130 |

FOREIGN PATENT DOCUMENTS

| 1174418 | 7/1964 | Fed. Rep. of Germany | 310/154 |
|---|---|---|---|
| 2263169 | 6/1974 | Fed. Rep. of Germany | 310/154 |
| 2263170 | 6/1974 | Fed. Rep. of Germany | 310/154 |
| 2305591 | 8/1974 | Fed. Rep. of Germany | 310/154 |

OTHER PUBLICATIONS

*IBM Tech. Disclosure Bulletin,* vol. 10, No. 8, 1/68, p. 1233, Fisher et al.

Primary Examiner—Donovan F. Duggan
Attorney, Agent, or Firm—Staas & Halsey

[57] ABSTRACT

A direct current dynamo electric machine comprising a non-magnetic cylindrical rotor wherein a small-diameter sleeve-like insulating cylinder is secured to a rotor shaft, a winding is disposed around the outer periphery of said insulating cylinder and most of the volume of the rotor is occupied by the winding, a mechanism for rotatably supporting the rotor, and a stator having permanent magnets for equalizing the leakage flux of the field of permanent magnets by means of a reverse magnetic field, a large magnetic field being applied to the non-magnetic cylindrical rotor.

7 Claims, 10 Drawing Figures

DIRECT CURRENT DYNAMO ELECTRIC MACHINE

This is a continuation of application Ser. No. 750,890 filed Dec. 15, 1976 now abandoned.

BACKGROUND OF THE INVENTION

1. Field of the Invention

This invention relates to a direct current dynamo electric machine in which intense magnetic field poles formed by permanent magnets are arranged externally of a non-magnetic cylindrical rotor having most of its volume occupied by the winding.

2. Description of the Prior Art

In order to enhance responsiveness of a direct current dynamo electric machine, there is heretofore proposed rotors such as a smooth rotor with a winding disposed in the outer periphery of a smooth core, a print wired or printed circuit rotor having no rotor core, or a cup-shaped rotor with a winding formed into a cup-shape. The abovementioned smooth rotor is designed so that a winding is formed in the outer periphery of a core of the smooth rotor by the use of a print wiring technique or a wound winding is bonded thereto by means of an adhesive. This smooth rotor poses a drawback that in the case where the gap magnetic flux density is great, the rotor core has increased iron losses, as a consequence of which efficiency is low, and in addition, the smooth rotor suffers from a problem in terms of manufacturing technique in that securing a winding onto the core of the smooth rotor is difficult. There is another drawback in that when the winding is formed by the print wiring technique, the number of turns of winding is limited. Moreover, a high input power must be applied in order to obtain high speed responsiveness, and when the winding is thinly disposed on the core of the smooth rotor, despite the presence of such a high input power, it is not easy to fix the rotor core and the winding so as to sufficiently maintain a fixed relationship therebetween.

In the print wired rotor, a print wiring technique is applied to one side or both sides of an insulating disc to form a winding. This rotor poses a drawback that the number of turns of the winding is limited so that the efficiency is low when the rotational speed is low. Further, while the axial dimension can be reduced, the radial dimension increases in order to obtain the desired torque.

The cup-shaped rotor may be of two types, one of which is arranged such that a winding is very thinly formed into a cup-shape, whereas the other is that a winding is relatively thickly formed into a cup-shape. However, in the former type, there is a limitation in the number of turns such that it fails to enhance the efficiency of the motor when the rotational speed is low. In addition, the mechanical strength of such a rotor is small, and as a consequence, the rotor as described cannot be applied to a small output DC dynamo electric machine. In the latter type of rotor, on the other hand, the number of turns may be increased to render a relatively high efficiency at a low rotational speed, but in this case, the length of gap must be increased so that the gap magnetic flux density cannot be increased. Moreover, the cup-shaped rotor poses a drawback in that since it is supported on the shaft in a cantilever fashion, the mechanical strength is decreased.

What is therefore proposed is a cylindrical coreless rotor designed so that a rotor winding is disposed on a shaft of the rotor through a sleeve-like insulator. In this rotor, most of its volume is occupied by a winding, resulting in a large capacity of winding, thereby providing advantages such as extremely low inductance, mechanical sturdiness and low inertia. An intense magnetic field may be exerted on such a cylindrical coreless rotor to thereby obtain high efficiency, a small mechanical and electrical time constant, high responsiveness and shock-resisting input. However, since this cylindrical coreless rotor is non-magnetic, the space between magnetic field poles can be regarded as an equivalent working air gap. Thus, in order to exert the intense magnetic field on the lengthy gap as described, permanent magnets of high coercive force made of anisotropic strontium ferrite, barium ferrite or other material are well-suited. However, in the case where such permanent magnets are used to form a magnetic path having a long length of gap while being subjected to restriction in terms of form, what is called the ratio of form output, it is difficult to converge the magnetic flux of the magnetic poles in view of the ratio between the length of gap and the length of the magnetic shunt leakage in the main magnetic path. That is, most of magnetic flux are consumed as the leakage magnetic flux while the effective magnetic flux are decreased, thus producing various difficult problems in forming the actual magnetic paths.

Alternatively, in Japanese Patent Laid-open No. 50-95705 filed in Japan by The Singer Company, U.S.A., and corresponding to U.S. Pat. No. 3,891,876, there is disclosed a permanent magnet motor, in which no measure has been taken with respect to the large leakage magnetic flux inevitably produced in a magnetic field path having a long length of gap. Hence, even if permanent magnets made of rare earth alloy were to be used in this motor, the magnetic characteristic thereof cannot effectively be utilized. Further, in dynamo electric machines of relatively high output, samarium cobalt magnets are costly and permanent magnets cannot effectively be utilized. In the light of these points, the device disclosed in the abovementioned patent possesses a fatal disadvantage in terms of practical industrial use.

Also, in Japanese Patent Laid-open No. 50-125203 filed in Japan by the same applicant as that of the former (U.S. patent application bearing Ser. No. 453,738, filed Mar. 22, 1974), there is disclosed a motor in which the rotor core used in a DC dynamo electric machine is generally non-magnetized. Hence, this rotor is in the form of a coreless rotor, but most of the volume of the rotor is not occupied by a winding. The cylindrical coreless rotor imparts a gap length corresponding to the outside diameter thereof and equal to the space between the magnetic field poles, and as a consequence, the stacked density of the winding of the rotor will influence the performance.

SUMMARY OF THE INVENTION

It is therefore an object of the present invention to provide a direct current dynamo electric machine having a cylindrical coreless rotor as described above, and particularly, a direct current dynamo electric machine provided with a stator which can exert an intense magnetic field on a rotor, despite the presence of a rotor made of a non-magnetic material, located between the magnetic field poles of permanent magnets used to create the machine's field.

It is another object of the invention to easily form a winding for the cylindrical coreless rotor as previously mentioned.

In brief, a device constructed in accordance with the invention comprises a non-magnetic cylindrical rotor and a stator; the rotor includes a plurality of retaining plates with projections formed at opposite sides thereof radially secured to a small diameter insulating sleeve-like cylinder; said insulating cylinder is secured to a rotational shaft; said retaining plates have coil sections inserted therebetween; said coil is divided into two parts and wound to form a rotor winding; the ends of said coils are held within said projections of the retaining plates; the stator comprises permanent magnets for equalizing the magnetic field of the permanent magnets which are opposedly disposed externally of said cylindrical coreless rotor and blocking the leakage magnetic flux of said magnetic field of said permanent magnets by means of a reverse magnetic field.

DESCRIPTION OF THE PREFERRED EMBODIMENTS

Figure 1:
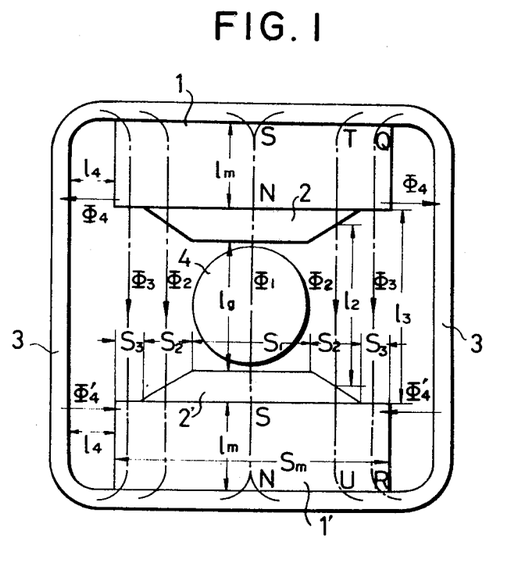
FIG. 1 is a view of assistance in explaining the magnetic path in a direct current dynamo electric machine.

Referring now to FIG. 1, there is shown a yoke 3 made of pure iron or the like, which is internally provided with main magnets 1 and 1' made of strontium ferrite, barium ferrite or other material, the main magnets 1, 1' having pole shoes 2 and 2', respectively, made of pure iron or the like attached thereto so as to oppose each other outside a cylindrical coreless rotor 4 schematically illustrated in the figure.

Let $S_1$ be the pole area, which is the product of pole width corresponding to the rotor 4 and depth of the magnetic path perpendicular to the paper surface, $S_2$ the average area about line TU at an inclined portion on the side of the magnetic pole, $S_3$ the area about line QR at the end of the main magnet, and $S_m$ the sectional area of the main magnet, and let $\phi_1$ be the magnetic flux in area $S_1$, $\phi_2$ the magnetic flux in area $S_2$, $\phi_3$ in area $S_3$, $\phi_m$ the total magnetic flux in sectional area $S_m$ of the main magnet, $\phi_4$ and $\phi'_4$ the magnetic fluxes between the main magnets 1 and 1', respectively, and the yoke 3, and $\phi_Y$ the leakage flux along the surfaces in the periphery of the main magnets, then total magnetic flux is given by $$\phi_m = (\phi_1 + 2\phi_2 + 2\phi_3) + 2\phi_4 + \phi_Y \quad (1)$$

Although values depend upon the magnetic characteristic, dimensional ratio, and contour of magnetic path of the permanent magnet, as for example, $2\phi_4 + \phi_Y$ reaches 50% of $\phi_m$, and $\phi_1$ is equal in value to $(2\phi_2 + 2\phi_3)$, that is, the effective field magnetic flux $\phi_1$ is relatively small, say, 25% of the total magnetic flux $\phi_m$.

Let $l_m$ be the length of the main magnets 1 and 1', $l_g$ the length of gap, $\phi_1/\mu_0 S = H_g$ the magnetic field of the gap, where $\mu_0 = 1$ according to CGS unit, $B_m = \phi_m/S_m$ the magnetic flux density of the main magnets 1, 1', and $H_m$ the magnetic field corresponding to $B_m$ from the magnetic characteristic of the magnets, ignoring the magnetic resistances of the pole shoes 2 and 2' and yoke 3, and from a closed curve passing the main magnets 1, 1' and yoke 3 along the center line of $\phi_1$, then the magnetic field $H_g$ of the gap is represented by $$\phi H \cdot dl = \int_{l_g} H_g dl - 2 \int_{l_m} H_m dl \quad (2)$$

$$= H_g l_g - 2 H_m l_m = 0$$
$$H_g = 2 H_m l_m / l_g$$

Figure 2:
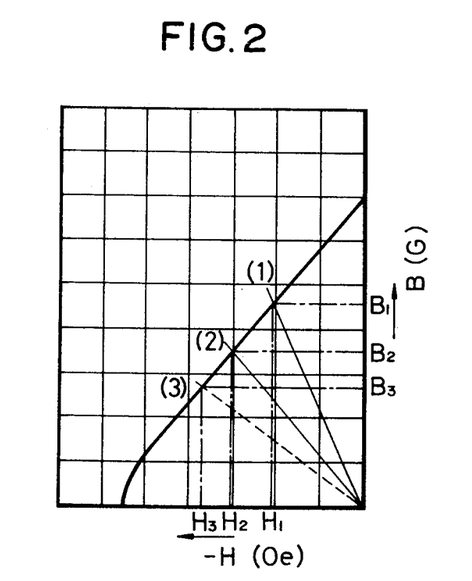
FIG. 2 is a view of assistance in explaining the magnetic characteristic of a permanent magnet.

In FIG. 2 showing the magnetic characteristic of the main magnets, the magnetic flux density is increased by means of the aforesaid leakage fluxes $\phi_2$, $\phi_3$ and $\phi_4$, and as in (1), the operating point shows a low value, $-H_1 = H_m$ deviated from the position of the maximum energy product of the magnets.

A decrease in $H_m$ in equation (2) in addition to a decrease in effective magnetic flux $\phi_1/\phi_m$ cuased by the leakage fluxes exhibits a very disadvantageous condition of the magnetic path of the permanent magnet having the long gap length.

In order to obtain an intense magnetic field as described above and to avoid the leakage fluxes in the magnetic field path caused by the permanent magnets having a long gap length it is necessary to lengthen the leakage magnetic paths $l_2$, $l_3$, and $l_4$ so that they are several times as long as the gap length $l_g$ shown in FIG. 1 to minimize their influence. Therefore, the yoke 3 materially increases in size to the point of being impractical.

Figure 3:
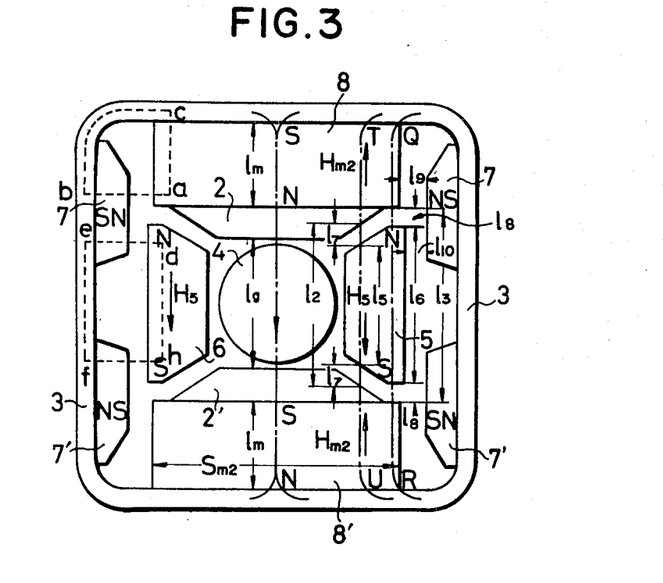
FIG. 3 is a view of assistance in explaining a stator in the form of one embodiment in accordance with the present invention.

FIG. 3 is a view of assistance in explaining the first embodiment according to the present invention, in which parts common to those in FIG. 1 are identified by the same reference characters.

This invention is characterized by a reverse field, for equalizing the leakage magnetic field applied to impede a great amount of the leakage fluxes produced in the magnetic paths formed by permanent magnets having a long gap length to thereby converge the field fluxes in the long gap portion thus greatly enhancing the effective magnetic fluxes and at the same time reducing the length of the magnetic circuit.

In FIG. 3, a yoke 3 made of pure iron or the like is internally provided with main magnets 8 and 8' composed of permanent magnets having a high coercive force and made of strontium ferrite, barium ferrite or other material; the main magnets 8, 8' have relatively thin trapezoidal pole shoes 2 and 2' made of pure iron or the like attached thereto so as to oppose each other outside a cylindrical coreless rotor 4.

Blocking magnets 5 and 6, which are composed of anisotropic permanent magnets, preferably having the same magnetic characteristic as that of the main magnets, are disposed between poles of the main magnets through gaps $l_7$ and $l_8$, respectively. Further, blocking magnets 7 and 7' are opposedly disposed through gaps $l_9$, $l_{10}$ so as to occupy parts of sides of the main magnets and sides of the blocking magnets 5, 6. While these blocking magnets 7 and 7' preferably have the same magnetic characteristic as that of the blocking magnets 5 and 6, it is to be understood that other anisotropic permanent magnets may also be employed.

Figure 4:
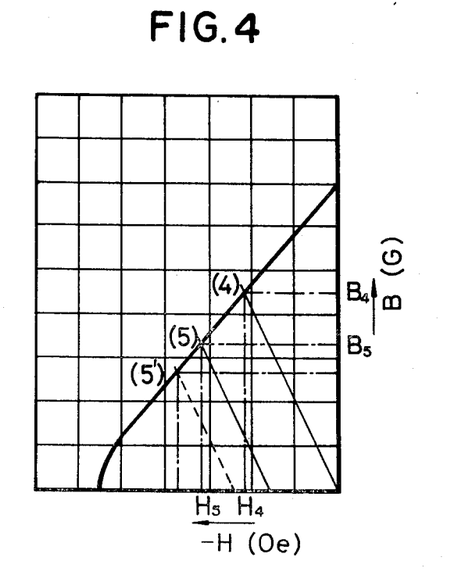
FIG. 4 is a view of assistance in explaining the magnetic characteristic of a permanent magnet.

FIG. 4 illustrates the magnetic characteristic of the blocking magnets 5 and 6. In the demagnetization curve of FIG. 4, the blocking magnets 5 and 6 have their operating point positioned at (4) in an open magnetic path though it may vary with ratio of dimension and contour thereof, and by arranging them between the main magnets 8 and 8', the operating point moves to positions at (5) and (5') as a result of receiving a demagnetizing force produced by the main magnets 8 and 8'.

If, in the magnetic path illustrated in FIG. 1, the greater part of the leakage magnetic fluxes $\phi_2$, $\phi_3$ forming a non-magnetic shunt in the gap $S_1$ and the leakage magnetic flux $\phi_4$ between the main magnets and the yoke should have been blocked, the leakage magnetic fluxes in the main magnets materially decrease, and as a consequence, the operating point in the demagnetization curve of the main magnets shown in FIG. 2 moves from position (1) to position (3). Accordingly, the blocking magnets receive a great reverse field and thus the operating point in FIG. 4 moves to position (5').

Since both the main magnets and blocking magnets have their working point positioned in a region where they are invariant with respect to a change in temperatures, the sectional area $S_{m2}$ of the main magnet in FIG. 3 is less than the sectional area $S_m$ in the case of FIG. 1, and the operating point in FIG. 2 is set to position (2) while blocking the leakage magnetic fluxes. Accordingly, the reverse field caused by the main magnets decreases and the operating point of the blocking magnets is also set to position (5) in FIG. 4.

If Ampere's circuital law is applied along the average center line TU at a pole inclined portion in FIG. 3, that is, a closed curve reaching the yoke 3 via the length $l_m$ of the main magnet, gap $l_7$, length $l_5$ of the blocking magnet, gap $l_7$, and length $l_m$ of main magnet, there is present no interlinkage current in the magnetic path and thus no rotation of vector involves, rot H=0, then line integration of the closed curve is zero. Let the direction of magnetic flux density be the positive, $H_{m2}$ the magnetic field of the main magnets, and $H_7$ the magnetic field of the gap $l_7$. Since the permeability of the pole shoes 2, 2' and yoke 3 is in excess of $10^3$, this can be abbreviated:

$$\phi H \cdot dl = \int_{l_5} H_5 dl + 2\int_{l_7} H_7 dl - 2\int_{l_m} H_{m2} dl = 0 \quad (3)$$

If the first and third terms are in equilibrium, the second term is zero, $H_7 \approx 0$. Hence, $$\phi H \cdot dl = H_5 l_5 - 2H_{m2} l_m = 0 \quad (4)$$
$$H_5 l_5 = 2H_{m2} l_m$$
$$H_5 = 2H_{m2} l_m / l_5 [O_e]$$

$H_{m2}$ corresponds to $H_2$ in the abovementioned demagnetization curve in FIG. 2. The sectional area is determined so that the operating point of the blocking magnet 5 is set to position (5) in the demagnetization curve in FIG. 4, and equilibrium in equation (4) is set by the length $l_5$ of the blocking magnet.

Even if a slight unbalance should occur in equation (4) due to a difference in temperature coefficient between the main magnet and blocking magnet or uneveness of material, the magnetic field caused by the unbalance is applied to the gap $2l_7$, and hence, the reverse field is less affected.

Also, with respect to the line QR from the end of the main magnet to the blocking magnet 5, the closed curve composed of the dotted lines a, b and c from the side of the main magnet 8 to the blocking magnet 7 and yoke 3, and the closed curve composed of the dotted lines d, e, f and h from the side of the blocking magnet 6 to the yoke 3, respond to analysis similar to that taught above so as to set the length $l_6$ of the blocking magnet 5 and the blocking magnet 7.

In accordance with the first embodiment of the present invention, the ratio between the field flux $\phi_g$ and the total flux $\phi_{m2}$ of the main magnets, that is, the effective magnetic flux was 70% under the unfavorable condition of a long gap length.

Figure 5:
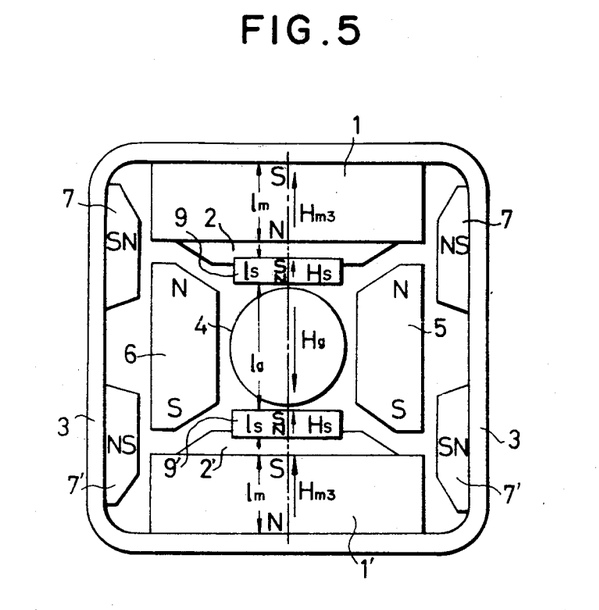
FIG. 5 is a view of assistance in explaining a stator in the form of another embodiment in accordance with the present invention.

FIG. 5 is a view of assistance in explaining the second embodiment in accordance with the present invention, in which parts common to those in FIGS. 1 and 3 are identified by the same reference characters.

This embodiment provides an arrangement similar to that shown in the first embodiment, in which leakage magnetic fluxes are blocked to converge the field magnetic fluxes in the long gap. In addition, this specific embodiment provides permanent magnets made of material of the samarium group or other group whose coercive force is high; the magnets are disposed in field pole portions. This affords an intense magnetic field in the long gap and a magnetic path which is very useful in terms of economy.

In an effort to block the leakage magnetic fluxes by means of a reverse field to impart a high magnetic flux density to the gap, as previously described, permanent magnets for the field and permanent magnets for the reverse field comprised only samarium cobalt magnets.

In FIG. 5, permanent magnets 9 and 9' having a high coercive force and made of a material of the samarium group are disposed on pole shoes 2 and 2', respectively. Let $l_s$ be the length of the permanent magnet and $H_s$ the field intensity in the working point. The reference characters and material for various parts are common to those shown in FIG. 3 with the exception that the sectional area of the main magnets 1 and 1' is different from $S_{m2}$ shown in FIG. 3 but is common to $S_m$ shown in FIG. 1.

For example, since the samarium group permanent magnets have high coercive force and energy, they are very effective for fine magnetic paths. However, if these magnets are used as the main magnets in an attempt to obtain an intense field in the long gap, the costs increase substantially, which is economically disadvantageous for use in industrial products.

In accordance with this embodiment, permanent magnets made of anisotropic strontium ferrite, barium ferrite or other material are used as the main magnets in order to pass magnetic fluxes through the magnetic path whose gap length is long, and the large amount of leakage magnetic fluxes inevitably produced are blocked so as to converge the magnetic fluxes in between the field poles; permanent magnets 9 and 9' having a high coercive force, comprise permanent magnets formed by the addition of a small amount of samarium group material attached to tips of the poles, whereby the resultant magnetic structure is capable of economically forming a very intense composite field as will be described hereinafter.

In FIG. 5, blocking magnets 5, 6, 7, 7' are disposed on the magnetic path shown in FIG. 1 so that the operating point of the main magnets 1, 1' may assume position (3) in the demagnetization curve of FIG. 2 in a state with the leakage fluxes blocked, and permanent magnets of high coercive force made of a material of the samarium group or other material attached to the magnetic pole shoes are arranged to increase the magnetic flux density in the gap and the main magnets thereby setting the operating point to position (2).

The circuital integration of a closed curve reaching the yoke 3 through a line consisting of length $l_m$ of main magnets 1, 1' along the center line of the magnetic field, length $l_s$ of the samarium group permanent magnets 9, 9', gap $l_g$, length $l_s$ of permanent magnets 9, 9' of high coercive force made of a samarium group material or other material, and length $l_m$ of main magnets 1, 1', is given by $$\oint H dl = \int_{l_g} H_g dl - 2 \int_{l_s} H_s dl - 2 \int_{l_m} H_{m3} dl \quad (5)$$

$$= H_g l_g - 2 H_s l_s - 2 H_{m3} l_m = 0$$

where $H_{m3} = H_2$ is the magnetic field in the operating point of the main magnets, and $H_g$ is the magnetic field in the gap, ignoring the magnetic resistance of the pole shoes 2, 2' and yoke 3.

$$H_g l_g = 2(H_s l_s + H_m l_m) \quad H_g = 2(H_s l_s + H_m l_m)/l_g \quad (6)$$

As given in equation (6), a composite magnetic field, composed of the field of the main magnets obtained by blocking the leakage fluxes and the magnetic field of the samarium group permanent magnets, may be concentrated on the gap portion to thereby produce an intense magnetic field in the long length of gap. In this case, the ratio of the field flux $\phi_g$ to the flux $\phi_{m3}$ of the main magnets, that is, the effective flux, reaches 84%. In accordance with the present invention, the intense magnetic field may be applied externally of the cylindrical coreless rotor, having a large winding capacity to volume ratio and a low inertia, so as to obtain a controlling DC motor of high efficiency with a high performance response.

Next, a cylindrical coreless rotor used in the embodiment of the present invention will be described.

Figure 6:
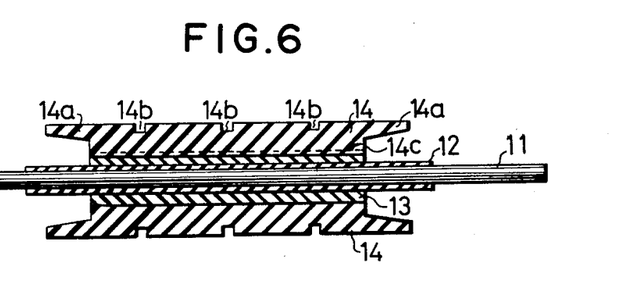
FIG. 6 is a sectional side elevation of a rotor before a winding is applied thereto in a further embodiment of the present invention.
Figure 7:
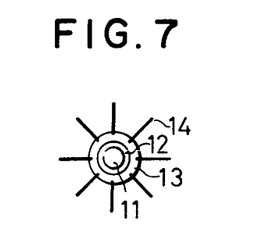
FIG. 7 is a front view of the rotor shown in FIG. 6.

FIG. 6 is a sectional side elevation of the rotor before a winding is applied thereto, and FIG. 7 is a front view thereof. The rotor comprises a rotational shaft 11 made of a non-magnetic material such as stainless steel, a thin insulating layer 12 coated thereon, a small diameter sleeve-like insulating cylinder 13 secured to the outer periphery of the insulating layer, and a retaining plate 14 inserted fixedly within a plurality of axial recesses made in the insulating cylinder 13. This retaining plate 14 is formed with projections 14a taperingly extending from opposite axial ends thereof and a suitable number of recesses 14b externally thereof, the base portion 14c to be inserted in the recess of the insulating cylinder 13 having substantially the same length as the axial length of the insulating cylinder 13. Preferably, the retaining plate 14, the insulating layer 12 and the insulating cylinder 13 are made of heat-resisting plastics, for example, epoxide resin. It will also be understood that the insulating layer 12 and the insulating cylinder 13 may integrally be formed.

Figure 8:
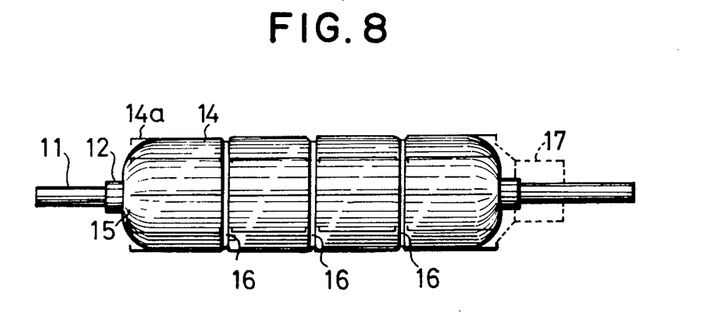
FIG. 8 is a side elevation of the rotor shown in FIG. 6 but the winding being applied thereto.

FIG. 8 is a side elevation of the cylindrical coreless rotor with the winding applied thereto, in which reference numeral 15 designates a winding, 16 a binding wire, and 17 (as indicated by the dotted lines) a commutator. In this winding, one coil does not comprise one winding but two windings so as to enable the winding of the entire coil without forming a space over the small-diameter insulating cylinder 13. Also, the wound wire can be firmly held by the provision of projections 14a of the retaining plate 14 without disordering the wire, and hence, winding may be effected by an automatic winding machine.

It is preferable that after the winding 15 has been applied, the binding wire 16 such as a nylon group material or the like is wound along the recesses 14b in the retaining plates 14 to impair the expansion of the winding 15. An insulating material such as epoxide resin is impregnated for the purpose of fixedly attaching and giving a moisture proof barrier to the winding 15. After the winding 15 has been fixed by the insulating material such as epoxide resin, the binding wire 16 may also be removed. It is noted that if the binding wire 16 is unremoved, it can protect more positively the winding 15 from flying-out due to centrifugal force thereof.

Figure 9:
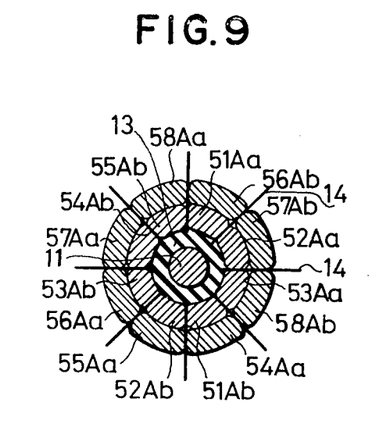
FIG. 9 and FIG. 10 are views of assistance in explaining the process for forming the winding.
Figure 10:
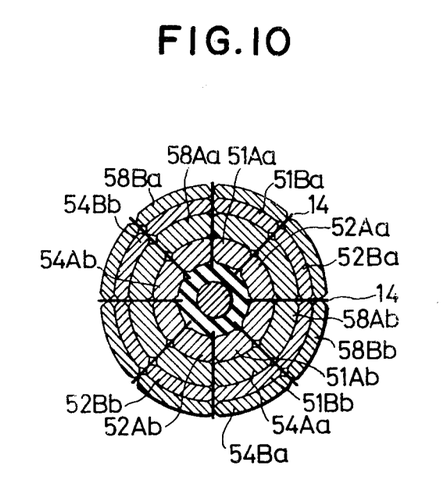

As shown in FIG. 9, half of the aforesaid winding 15 is first wound, after which, as shown in FIG. 10, the remaining half is wound. In the case where eight retaining plates 14 are disposed on the insulating cylinder 13 and equally spaced apart to form eight coils, a first coil portion composed of coil sections 51A$a$, 51A$b$, ... 58A$a$, 58A$b$ dividing the coil into two is first formed. That is, a coil portion composed of the coil sections 51A$a$, 51A$b$ is first formed, and another coil portion composed of the coil sections 52A$a$, 52A$b$, is then formed, and in this manner, coil portions composed of coil sections 58A$a$, 58A$b$ are successively formed.

Accordingly, each first coil portion has one half the number of turns with the coil divided into two so that a winding may be formed on the small-diameter insulating cylinder 13 without producing a clearance, and the outer periphery on which the first coil portion is wound is cylindrical in shape about the shaft 11.

Next, a second coil portion composed of coil sections 51B$a$, 51B$b$ is formed, ... 58B$a$, 58B$b$ as shown in FIG. 10, the diameter in the outer periphery of the first coil portion previously mentioned is relatively large so that the second coil portion may readily be wound about the outer periphery thereof without producing a clearance. The coil ends are held within the projections 14a at the opposite ends of the retaining plate 14, and therefore, even if winding is effected to a degree such that the surface thereof is substantially at the same level as that of the outer surface of the retaining plate 14, there is no disorder produced in the winding.

Thus, coils can be wound without producing a clearance about the outer periphery of the insulating cylinder 13, which has a thickness great enough to impart the necessary dielectric strength with respect to the rotational shaft 11 as previously described, thereby providing a cylindrical coreless rotor almost similar to that constructed by the winding 15. Because there is no disorder in the winding equipment, automatic winding may also be employed to form a winding 15.

In accordance with this embodiment, as described above, no rotor core is used, so that there is no fear of producing iron loss and furthermore, a lower inertia is achieved. In addition, there is virtually no limitation in the number of turns of the winding of the rotor thereby increasing the overall efficiency at a low rotational speed. Further, the ratio of the winding capacity to the volume of the rotor may be increased, and the torque constant of the rotor may be increased. Furthermore, since the rotor is of the coreless type, the inductance in the winding can be minimized thus providing a rotor winding of low impedance as required for a high speed response and increasing the commutating characteristic. Moreover, the coil ends are held by the projections at opposite ends of the retaining plate so that the rotor winding may easily be formed, and the coil is divided into two for winding purposes so that it may be formed on the small-diameter insulating cylinder without producing a clearance, and in addition, automatic winding equipment may be employed.

Because of the effect attained by the retaining plate with projections, the winding ratio of the winding may be suitably selected whereby the winding can be applied in a procedure similar to that of prior art lap winding techniques without dividing the coil into two sections.

In the direct current dynamo electric machine using a rotor which is of the coreless type with most of its volume occupied by a winding, as previously described, it seems to be considered that the gap magnetic flux density is small because the space between the poles can be regarded as the gap. However, the sectional area and length of permanent magnets having a high coercive force and the contour of the pole shoes may be selected as previously described to thereby obtain a sufficiently high gap magnetic flux density. As a consequence, where a DC motor is constructed by incorporating a cylindrical coreless rotor in accordance with the present invention, a motor having a high speed response and high efficiency results. Where a DC generator is constructed in a manner similar to the above-noted motor, a generator may be constructed having a good linearity characteristic between the rotational speed and generated voltage.

What is claimed is:

1. A direct current dynamo electric machine comprising:
   (a) a non-magnetic cylindrical rotor comprising (i) a rotor shaft, (ii) a small diameter sleeve-like insulating cylinder secured to the rotor shaft, (iii) a winding structure with a high-density winding disposed around the outer periphery of the insulating cylinder to occupy a substantial portion of the volume of the rotor between the outer periphery of the insulating cylinder and the outer diameter of the rotor, and (iv) means for disposing of and shaping a large number of coil ends of the winding; and
   (b) a stator for rotatably supporting the rotor and comprising (i) a yoke, (ii) a pair of main magnets disposed in opposing relation to each other in the yoke, the main magnets being rectangular in cross-section and larger in width than the outer diameter of the rotor in a direction perpendicular to a magnetic field established by the main magnets, (iii) thin trapezoidal pole shoes mounted on the opposing surfaces of the main magnets along substantial portions of the entire areas of the surfaces thereof and wherein each pole shoe has a rotor-opposing surface corresponding to the diameter of the rotor and the pair of pole shoes define therebetween a large working air gap to form a double-pole magnetic field corresponding to the outside portion of the rotor, and (iv) a pair of blocking permanent magnets disposed in opposing relation to each other on opposite sides of the rotor between the main magnets with air gaps formed at both ends of each blocking permanent magnet, for equalizing leakage magnetic fields occurring on both sides of the rotor between those surface portions of the main magnets and the pole shoes not facing the rotor with a reverse magnetic field of the blocking permanent magnets, thereby to converge magnetic fluxes on the rotor.

2. A direct current dynamo electric machine according to claim 2, wherein the main magnets and the blocking magnets are selected from a group of anisotropic ferrite magnets of the same magnetic characteristics.

3. A direct current dynamo electric machine according to claim 2, wherein the main magnets and blocking magnets are selected from a group consisting of barium ferrite and strontium ferrite magnets.

4. A direct current dynamo electric machine according to claim 2 further comprising intensifying magnets formed by permanent magnets having a small amount of very high coercive force, but not constituting any main magnets themselves, the intensifying magnets being respectively disposed on the rotor-opposing surfaces of the pole shoes so that the direction of the magnetic field of the intensifying magnets and the direction of the magnetic field in the working air gap are vectorially added together to obtain a composite magnetic field.

5. A direct current dynamo electric machine according to claim 3, wherein the permanent magnets of high coercive force are samarium group magnets.

6. A direct current dynamo electric machine according to claim 2, wherein the rotor shaft comprises a rotational shaft and the small diameter sleeve-like insulating cylinder is secured to the rotational shaft; wherein the rotor further comprises a plurality of retaining plates radially secured to the insulating cylinder, both end portions of each retaining plate in the axial direction along the rotor shaft forming projections taperingly extending from opposite axial ends thereof; and wherein the winding further comprises a plurality of coil sections inserted between the retaining plates, each coil section being divided into an inner winding and an outer winding wound separately, and shaping of a large amount of coil ends being secured by the projections in the retaining plate and the two divided windings.

7. A direct current dynamo electric machine according to claim 6, wherein the retaining plates have a plurality of recesses formed in the outer radial circumferences thereof and disposed along the axial direction thereof for receiving binding wire to impair expansion of the high-density winding.

* * * * *

UNITED STATES PATENT AND TRADEMARK OFFICE
CERTIFICATE OF CORRECTION

PATENT NO. : 4,376,903

DATED : Mar. 15, 1983

INVENTOR(S) : Mishima

It is certified that error appears in the above-identified patent and that said Letters Patent is hereby corrected as shown below:

```
Front page, [56] References Cited,
    "3,909,268" should be --3,906,268--.
Col. 1, line 35, after "of" (2nd. occurr.) insert --the--.
Col. 2, line 25, "are" should be --is--;
Col. 2, line 27, "are" should be --is--;
Col. 2, line 50, "motor" should be --rotor--.
Col. 3, line 12, "shaft;" should be --shaft for the rotor;--.
Col. 4, line 35, "cuased" should be --caused--;
Col. 4, line 42, after "length" insert --,--;
Col. 4, line 44, after "length" insert --,--.
Col. 5, line 61, "≈" should be --≑--.
Col. 7, line 36, "H_g=" should begin new line;
Col. 7, line 52,     "a" should be --an extremely--;
Col. 7, line 52, delete "used".
Col. 8, line 40, after "52Ab" delete ",";
Col. 8, line 50, delete "is formed" after "51Bb"; insert --is
    formed-- after "58Bb".
Col. 9, line 1, delete "equipment"; insert --equipment-- after
    "winding" (second occurrence).
Col. 10, line 22, "2" should be --1--;
Col. 10, line 31, "2" should be --1--;
Col. 10, line 43, "2" should be --1--.
```

Signed and Sealed this

First Day of November 1983

[SEAL]

Attest:

GERALD J. MOSSINGHOFF

Attesting Officer    Commissioner of Patents and Trademarks